July 2, 1968    L. CALDWELL    3,390,724
DUCT FORMING DEVICE WITH A FILTER
Filed Feb. 1, 1966    2 Sheets-Sheet 1
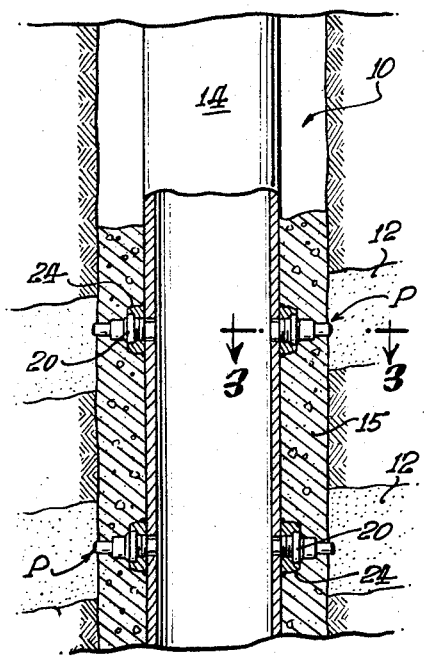
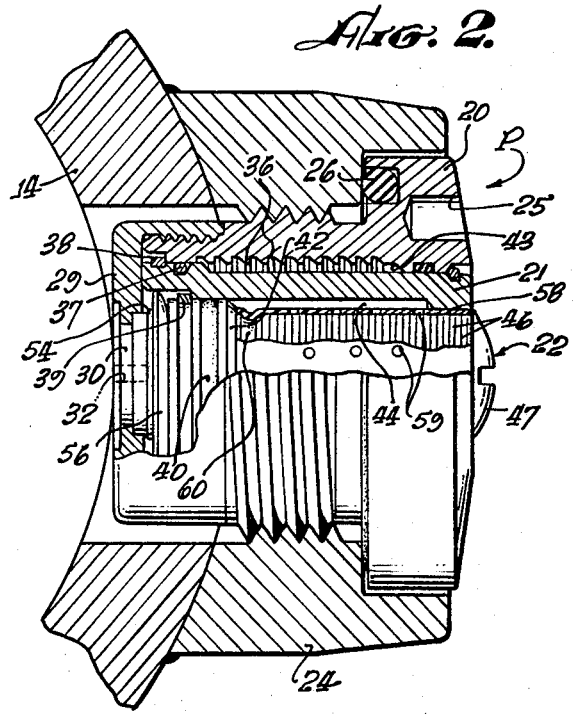
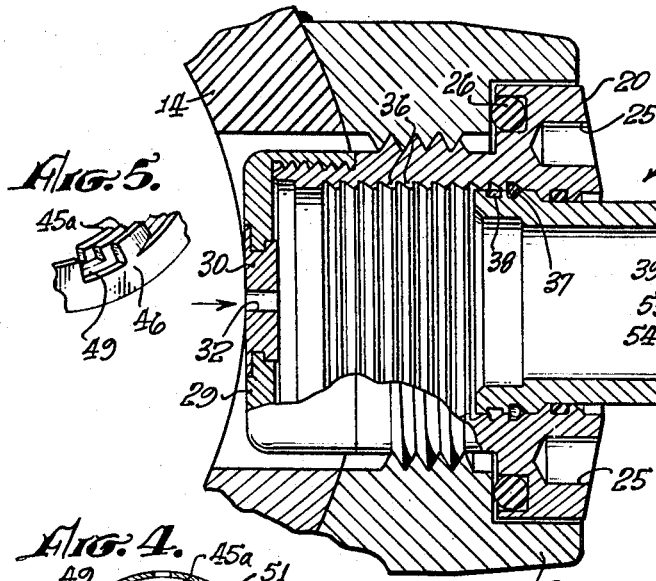
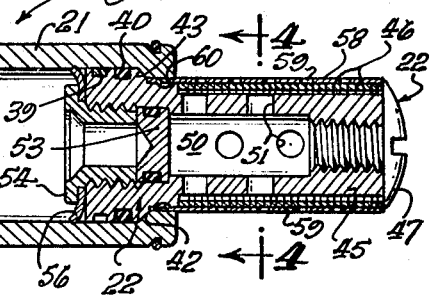
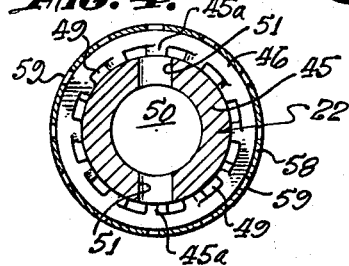
INVENTOR.
LYLE CALDWELL,
By Knight & Rodgers
ATTORNEYS

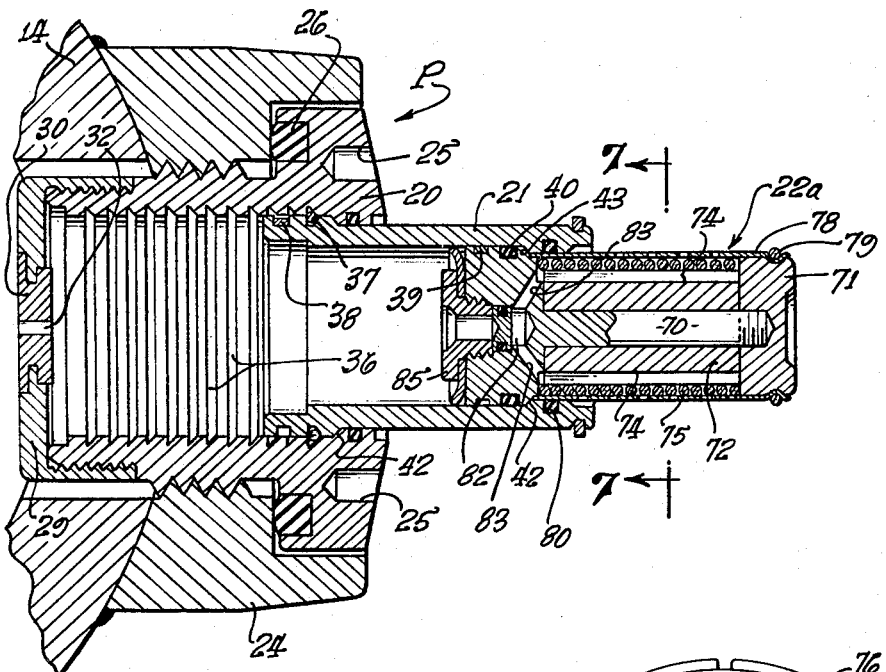
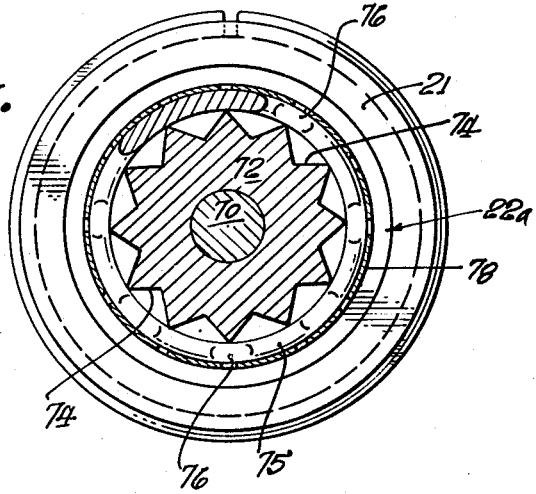
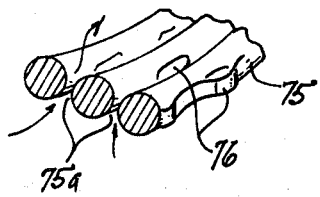

United States Patent Office 3,390,724
Patented July 2, 1968

3,390,724
DUCT FORMING DEVICE WITH A FILTER
Lyle Caldwell, Los Angeles, Calif., assignor to Zanal Corporation of Alberta, Ltd., Calgary, Alberta, Canada, a corporation of Canada
Filed Feb. 1, 1966, Ser. No. 524,270
12 Claims. (Cl. 166—100)

ABSTRACT OF THE DISCLOSURE

A filter is provided on a duct forming device mounted on oil well casing. The filter construction is such that the filter is covered or protected while the casing is run down the well but is exposed after the duct forming device is extended into contact with the formation. A particular advantage of the filter is its ability to retain much finer particles than has heretofore been possible, while at the same time allowing well fluids to pass through the duct former into the casing.

---

The present invention relates generally to oil wells, and more especially to a novel type of filter applied to a device for forming a fluid duct between the oil bearing strata exposed in an oil well and the interior of the casing, or the like, which has been lowered in the well bore and set in place, as by cementing.

It is common in the oil well art to lower steel casing into a bore hole which reaches to the oil bearing strata and then to place cement in the well outside of the casing to seal off the well bore above and/or below the production strata from water or other foreign material. This is done in order to isolate the production zone and permit only the desired oil or gas to reach the interior of the casing. For this purpose, it is necessary to provide ducts which extend between the interior of the casing and the face of the oil bearing strata, such ducts extending through the casing and through the cement which surrounds the casing, in order to provide access to the casing interior for oil and gas.

There are various known types of devices for forming these fluid ducts. The particular type of apparatus with which the present invention is concerned is exemplified by the device disclosed in U.S. Patent No. 2,775,304 granted Dec. 25, 1956, to Myron Zandmer and sold under the trademark "Permeator." As will be described more fully below, that patent discloses a duct forming device having a plurality of hollow, telescoping members which are mounted on the casing prior to lowering it into the well bore and which can afterwards be extended to project outwardly beyond the casing sufficiently far to reach the wall of the well bore. One or more of the telescoping members are moved outwardly by hydrostatic pressure inside the casing; and this extension of the members may be accomplished before or after the cement is placed around the casing although if the members are extended after cement is in place, this must be done while the cement is sufficiently plastic that the telescoping members can be extended through the cement to reach the face of the production zone.

It is often desired to use these duct forming devices in wells which have penetrated to producing formations which comprise in part fine, unconsolidated sands. Entry of sand into the casing is very harmful, as is well known. The fluid velocity entering the casing is often high enough to carry with it in suspension a substantial amount of sand. Once inside the casing, the fluid velocity decreases and the larger particles then settle out of the upwardly rising fluid stream, collecting in the bottom of the casing. Ultimately, and sometimes very quickly, the casing becomes filled with sand, and it is impossible to obtain any further production of oil or gas.

Accordingly, it becomes a general object of the present invention to provide a filter structure applicable to a duct forming device of the character described and capable of holding back the fine sands that may be encountered in many producing oil wells.

More particularly, it is an object of the present invention to devise a filter structure which may be applied to a duct forming device without changing the basic configuration of the device, such filter structure being non-clogging and capable of being cleaned of sand or other particles which have accumulated on it by backwashing or reverse flow from the casing outwardly through the filter.

At the outset, it may be well to establish what is meant by the term "sand." In a broad sense, the term "sand" is often used to refer generally to small mineral particles, including a wide range of sizes. In some respects, the present invention is concerned more with the lower range of particle sizes since it is at the lower size range that the particles are most difficult to collect and separate from the fluid stream. In "Chemical Engineer's Handbook" by John H. Perry, sands are stated to be particles coarser than 200 mesh. Other definitions by technical writers place the lower boundary of the size range of sand at perhaps a smaller particle size but do not differ significantly from this definition. A 200 mesh screen has an opening which is substantially .003 inch or .07 millimeter in each dimension. From the standpoint of particle sizes, it may be considered that it is an object of the present invention to provide a filter which is capable of removing from the fluid entering the oil well particles which are larger than about .002 inch or .05 millimeter in diameter.

These objects of the present invention have been achieved in a device embodying the present invention by providing a movable member defining at least a portion of the fluid duct extending between the interior and the exterior of the casing, means mounting said movable member on the casing for movement between an initial retracted position and an extended position, and filter means carried on the member and movable therewith. The filter means is entirely within the mounting means when the movable member is in the retracted position and is exposed by movement of the movable member to the extended position. The typical filter means is generally cylindrical in configuration and comprises a plurality of generally parallel filter elements defining a series of narrow, elongated openings which admit the fluid to the duct within the movable member.

In one form of the invention, the filter comprises a helically wound coil of wire with successive turns closely spaced to provide between successive turns the fluid openings through which the fluid enters the duct inside the device. These helically wound turns may, of course, be replaced by wire rings, likewise spaced. In another embodiment of the invention, the filter may be formed by a plurality of annular discs which are closely spaced apart. In all forms, the filter is preferably provided with means spacing apart the successive filter elements by a predetermined minimum amount in order to establish the maximum particle size which will pass through the filter.

How the above objects and advantages of the present invention, as well as others not specifically referred to herein, are attained will be more readily understood by reference to the following description and to the annexed drawing, in which:

FIG. 1 is a fragmentary vertical section through a segment of a bore hole and a casing set therein that is provided with duct forming devices constructed according to the present invention.

FIG. 2 is an enlarged horizontal section through one form of filter in the retracted position.

FIG. 3 is an enlarged horizontal median section through a filter in extended position, on line 3—3 of FIG. 1.

FIG. 4 is a vertical transverse section on line 4—4 of FIG. 3.

FIG. 5 is a further enlarged fragmentary perspective of a few discs forming the filter elements.

FIG. 6 is a horizontal median section, similar to FIG. 3, illustrating a variational form of filter means.

FIG. 7 is an enlarged fragmentary transverse section on line 7—7 of FIG. 6.

FIG. 8 is a further enlarged fragmentary perspective of a few turns of the filter elements.

Referring now to the drawing and more particularly to FIG. 1, there is shown a bore hole 10 which is drilled from the surface of the earth down into the ground to oil bearing strata indicated diagrammatically at 12. Inside the bore hole 10 there is lowered casing 14 with a plurality of duct forming devices P mounted on the casing. The casing is smaller in diameter than the bore hole, leaving around it an annular clearance which is perhaps about an inch, more or less. This clearance is non-uniform and is subject to considerable localized variation; but the dimension of the clearance is of no consequence as far as understanding the present invention is concerned.

The annular space around the casing may be ultimately filled at one or more sections of the length of the well with a layer of cement 15, or other suitable material, which is bonded to the wall of the bore hole and to the casing in order to provide a tight seal therewith, for reasons which are well known in the art. The cement may be placed by any suitable method, the details of which are not essential to a disclosure of the present invention. One method commonly employed involves pumping the cement in a fluid state down the inside of casing 14 and out of the casing at the bottom thereof. The fluid pressure inside the casing causes the fluid cement to flow upwardly in the annular space around the casing to fill the annular space, as indicated at 15.

After the cement has been placed around the casing and while it is still in a fluid condition, the duct forming elements are extended by fluid pressure applied from inside the casing, as will be more fully explained; and the duct forming elements are thus forced outwardly through the cement while in a plastic condition to reach the wall of the bore hole.

A typical device P is shown in some detail in FIG. 2 in which it will be seen that it comprises a body 20 within which is slidably mounted a first telescoping member 21, referred to herein as the sleeve. Inside sleeve 21 is a second telescoping member 22 which is axially movable with respect to the sleeve and is hereinafter referred to as the piston. The length of the two inner members 21 and 22 is such that when in the retracted or collapsed position of FIG. 2, the overall length of the unit is substantially equal to the length of body 20.

Body 20 is externally threaded and is screwed into a boss or mounting pad 24 which is mounted externally on casing 14. The boss is ordinarily welded on the casing and provides localized extra thickness to the casing wall to receive the threads for engaging the device P. The dimensions of boss 24 and body 20 are such that the body does not protrude into the casing, thus leaving the full internal diameter of the casing available for the passage of tools and appliances lengthwise of the casing.

From FIG. 2, it will be seen that the outer end of body 20 is provided with two or more recesses 25 which are adapted to receive a spanner wrench for turning the body to screw it into the boss, while on the underside of the flanged head of the body, there is provision for an O-ring or other sealing means 26 to prevent fluid leakage around the body.

The inner end of the body is closed by a screw cap 29 which is preferably threaded and screwed onto the inner end of the body as shown in FIGS. 2 and 3. Cap 29 is preferably made with a rim of steel or a ferrous metal that is not attacked by the acid treatment later described. Centrally of cap 29 is inset plug 30 which is a destructible element and is made of some metal, such as aluminum, zinc, magnesium, or the like, in order that the plug may be removed from the cap by a suitable chemical reagent. Alternatively, the entire cap may be of a destructible metal. For this plug, zinc is a preferred material since it is readily attacked by hydrochloric acid, which is one of the acids commonly used in oil well treating operations. Port 32 extends through the plug.

The internal bore in body 20 is provided with a plurality of closely spaced shoulders 36 which are designed to cooperate with lock ring 37 carried in an annular recess in sleeve 21. Lock ring 37 is a spring member which contracts in order to pass one or more of shoulders 36 as the sleeve moves outwardly and then expands to prevent inward or reverse movement of sleeve 21 after it has been extended in the manner later described.

Sleeve 21 is initially held against outward movement with respect to body 20 by a shear wire 38 carried in an annular groove in the sleeve and bearing against an inwardly facing shoulder on body 20. The strength of wire 38 in shear can be controlled so that by placing a predetermined length of wire in the position illustrated, a predetermined internal pressure against the inner end of piston 22 in sleeve 21 is required to shear wire 38 and allow the sleeve to travel outwardly. A similar shear wire 39 is provided in an annular groove in the base of sleeve 22 and bears against an inwardly facing shoulder on sleeve 21 to prevent outward movement of the piston until a predetermined hydraulic pressure has been applied to the inner end of the piston. If desired, the shearing values of wires 38 and 39 can be selected to give sequential extension of the piston and sleeve.

Piston 22 is a generally cylindrical member which at its base or inner end has an external diameter substantially equal to the internal diameter of sleeve 21. Suitable sealing means, such as O-ring 40, is carried in an annular peripheral groove at the base of piston 22 to provide a fluid-tight seal between the piston and the bore in sleeve 21.

Forwardly of O-ring 40, the outside diameter of piston 22 is reduced, thereby providing a forwardly facing shoulder 42 which is engageable with a similar shoulder 43 on sleeve 21, as shown in FIG. 3, in order to limit the outward travel of the piston relative to the sleeve. Beyond shoulder 43, the bore within sleeve 21 is reduced to provide only a minimum clearance between it and the piston while still allowing outward sliding movement of the piston relative to the sleeve.

It will be noticed that between shoulders 42 and 43 when the piston is in the retracted position of FIG. 2 there is an annular space 44 surrounding the piston and inside sleeve 21, which will be referred to again later.

Outwardly of shoulder 42, piston 22 is further reduced in diameter to provide a core 45 (FIG. 3) on which there is mounted a plurality of filter elements 46. In this embodiment of the invention, the filter elements 46 are flat, annular discs loosely mounted on core 45. The peripheries of the discs form a generally cylindrical filtering surface comprising a plurality of parallel filter elements between which there is a series of narrow, elongated openings, the width of which is determined by the inter-disc spacing. The stack of discs 46 is held in place on core 45 by any suitable means, for example, screw 47 which is threaded into the piston from the outer end thereof.

Discs 46 may have any desired configuration, but preferably resemble the well-known lock washers having smooth peripheries and inwardly extending lugs 45a surrounding the central opening through the disc. In order to establish a uniform spacing between successive discs, the lugs are preferably given a slight twist, as is well known with lock washers. These twisted lugs assist in aligning the discs so that the lugs stack one above another, forming substantially axial passages at 49 between successive lugs. Also the twisted lugs establish a spacing between successive discs which can be regulated to a value of about $2/1000$ or $3/1000$ of an inch as desired. Axially extending passages 49 act as drainage galleries or collecting passages at the base of the filter slots between successive discs so that the fluid passing through the filter elements enters the passages 49 and then travels longitudinally within the stack of filter elements.

Piston 22 is provided with an internal fluid passage 50 which extends into core 45 and has a plurality of radially extending branches 51 that communicate at their outer ends with one or more of longitudinal passages 49 and at their inner ends with the main central axially extending bore 50. Transverse or branch passages 51 can be provided by boring holes completely through core 45, it being preferable to provide at least two or three such holes as shown in order to provide for free communication between all of longitudinal passages 49 and central passage 50.

Initially, fluid passage 50 is closed by plug 53 which is made of some readily destructible material, such as aluminum, zinc, magnesium, or the like, which can be dissolved in acid or other reagent. Plug 53 is held in place by threaded sleeve 54 which enters the bore in piston 22 from the inner end thereof and is provided with a head by which lock ring 56 can be clamped in place at the inner end of piston 22. Sleeve 54 is hollow; and when plug 53 is removed by a chemical reaction, an unobstructed fluid communication is effected through piston 22 from axial passage 50 through threaded sleeve 54 and the interior of sleeve 21 to the opening in cap 29.

Lock ring 56 is of a diameter to engage the smooth inner wall of the bore through sleeve 21 (FIG. 3) after piston 22 has been moved outwardly for at least a portion of the length of the sleeve, in order to prevent reverse or return movement of the piston relative to the sleeve.

As casing 14 is lowered in the well, piston 22 and sleeve 21 on each of the duct forming devices P are in the retracted position of FIG. 2 in order to minimize the overall dimensions of the casing as it is lowered. After the devices have been lowered to the oil producing formation 12, and it is desired to extend them, either before or after the cement is placed, the fluid pressure inside the casing is raised to a unit value such that the piston and sleeve are extended outwardly with respect to body 20 and the casing. The fluid under pressure enters the device from casing 14 through port 32. The unit pressure is raised high enough to shear wires 39 and 38, thus driving the piston and sleeve outwardly to the extended position of FIG. 3. After extension, plug 30 and plug 53 are removed by dissolving them in hydrochloric acid, or other suitable chemical reagent, thus opening the entire fluid duct through the device, to permit inward flow of fluid from the space outside the casing through the device and into the interior of casing 14.

In the event that it is desired to enclose the filter to prevent entry of foreign material from drilling mud, the cement, or any other sources during initial phases of installation of the duct forming device, there may be provided a tubular metal sheath 58 around and outside of the filter. This metal sheath is preferably perforated with small holes 59 and is made of a metal, typically zinc, which is easily destroyed by the action of acids, or other chemical reagent. This enables the sheath to be removed at the desired stage in operations by introducing through the interior of the piston and into contact with the sheath a suitable acid or other reagent. The perforations in the sheath increase the speed of reaction with such reagent. The sheath is mechanically held in place in any suitable manner. For example, screw 47 may overhang the outer end of the sheath, while the inner end abuts against shoulder 42 on the piston. If desired, a groove at 60 may be cut in the outer surface of the piston inwardly of the filter elements and the sheath can be rolled into this groove as shown in FIG. 2, not only to obtain a tight fit with the piston but also to hold the sheath against shifting longitudinally with respect to the piston.

The entrance to the fluid duct within the deivce P is not at the end of the piston, as in the designs disclosed in the patent referred to above, but is at the periphery of the filter surface which has a generally cylindrical configuration, and more particularly at the circumferential slits in the filter surface which is provided by extended piston 22. This surface is, of course, in direct contact with the cement placed outside the casing; and the cement, it not first removed, restricts access of fluid from the formation 12 to the device P. An access passage can be provided between the cement and the fiilter surface in various ways, as, for example, by treating the cement locally with acid which is forced outwardly through the filter elements by internal pressure. Acid solution can reach the cement through the fluid duct within the device P after the plug 30 in cap 29 and the plug 53 in the piston are removed by acid treatment. This allows the acid solution to flow outwardly through the filter and reach the metal sheath 58 which is dissolved. The acid also attacks and removes some of the cement in the immediate vicinity of the filter. Removal of the sheath plus acid reaction on the cement provides a passage for fluid from the producing formation 12 around and into the filter carried by the extended piston.

A variational form of filter for a duct forming device is illustrated in FIGS. 6, 7 and 8. Referring to FIG. 6, it will be seen that the body 20 and sleeve 21 are constructed as described above. Piston 22a is modified to accommodate a different form of filter; but otherwise the device P is constructed as previously described, except for the particular changes noted below.

Piston 22a has a reduced diameter core 70 which is threaded at its outer end to receive nut 71. Mounted on core 70 is a hollow collar 72 which has a plurality of longitudinally extending grooves 74 cut in its outer surface, as shown in FIG. 7. These grooves 74 may have any desired shape and number and are a portion of the fluid passage through the duct forming device. Grooves 74 are in effect drainage galleries or collection passages into which the small filtering passages open.

Around core 70 is a helically wound wire 75 which provides the filter. The successive turns of wire 75 provide a plurality of parallel filter elements, while the spaces between successive turns are the series of narrow, elongated filtering openings or slots 75a through which fluid passes to be admitted to the fluid duct through the device. The helically wound coil of wire 75 is preferably wound to have a uniform spacing between successive turns, providing the desired filtering openings of perhaps only $2/1000$ or $3/1000$ of an inch in width. The minimum size of these openings can be established by winding the spring from wire which has been rolled to have short protuberances 76 located at intervals along the wire and of predetermined height, thus preventing the turns from coming closer together than the minimum distance established by protuberances 76. These are shown in FIG. 8, greatly enlarged.

Sheath 78 is held at its outer end by clamp ring 79 which seats in a groove in nut 71. Another advantage of sheath 78 is that, prior to removal, it provides a smooth exterior surface against which a fluid-tight seal may be obtained by O-ring 80 mounted near the outer end of sleeve 21.

A fluid passage through the piston is provided in part by central axially extending bore 82 which has at its inner end a plurality of branches 83 which extend outwardly to communicate with the inner ends of longitudinal collection passages 74. Passages 74 are immediately inside the filter elements and extend crosswise of the filtering openings 75a between successive turns of coil 75 to convey the fluid to branch passages 83 and thence to the center passage 82 from which fluid flows through the central bore of the sleeve and body into the interior of casing 14.

Initially, central bore 82 is closed by screw plug 85 which is destructible, being made of a metal easily dissolved by a suitable chemical reagent, for example, acid, as described above.

The operation of the device illustrated in FIGS. 6 and 7 is essentially the same as that already described.

If sheath 78 is not used, the interior passages 82, 83 and 74 of the piston may be filled with grease or the like which prevents entry of foreign matter but can be forced out of the piston ahead of the acid to allow acid to reach the producing formation.

From the foregoing description, it will be obvious without further illustration that the continuous length of helically wound wire 75 may be replaced by a plurality of annular rings of wire stacked in the same manner as the separate discs of the device illustrated in FIGS. 2 and 3.

The filter provides a relatively large total area of opening through which fluid can pass into the device P. At the same time, the limitation of the width of the filtering slots to some small value, such as .002 inch, enables the filter to hold back particles having a diameter larger than the width of the slots. These particles tend to form a filter cake on the outside of the filter having interstices in which particles smaller than .002 inch lodge. As a result, the filter becomes effective to actually retain a substantial proportion of the particles smaller than the size of the slots, after a filter cake begins to form.

After the filter cake becomes dense enough to materially retard forward fluid flow through the filter and into the casing, the filter cake can be removed by backwashing or reverse flow through the filter. It is obvious that this can be done since initially acid has been forced out through the filter to dissolve plugs or to react with the cement in the casing and also with the surrounding producing formation 12. This outward movement of fluid through the device P under sufficiently high pressure inside casting 14 forces the filter cake off of the filter and again opens up the filter to forward flow of fluid. When the casing pressure is reduced, flow again is from the formation into the casing and the filter again retains particles larger than the established minimum size.

From the foregoing description, it will be apparent that various changes in the specific design and ararngement of the component parts of the present invention may be made without departing from the spirit and scope thereof. Accordingly, it is to be understood that the foregoing description is considered to be illustrative of, rather than limitative upon, the invention as defined by the appended claims.

I claim:
1. A duct forming device for casing adapted to be lowered into a bore hole in the ground, comprising:
   a movable tubular member defining at least a portion of a fluid duct extending between the interior and the exterior of the casing;
   means mounting the movable member on the casing for sliding axial movement between an initial retracted position and an extended position;
   filter means carried exteriorly of the member and movable therewith, the filter means being within the mounting means when the movable member is in the retracted position and at least partially exposed outside the casing and the mounting means when the movable member is in the extended position;
   said filter means comprising a plurality of parallel filter elements defining a series of narrow elongated openings around the tubular member and admitting fluid to said duct; and a destructible sheath around and enclosing the filter means, said filter means being exposed upon removal of the sheath.

2. A duct forming device as in claim 1 in which the filter means comprises a plurality of filter elements defining a plurality of parallel, narrow filtering openings;
   and which also includes passage forming means defining a drainage passage extending transversely across a plurality of said filtering openings at the base thereof to collect fluid from a plurality of said openings, said drainage passage communicating with said fluid duct.

3. A duct forming device as in claim 1 in which the filter means comprises a helically wound coil of wire with fluid openings between successive turns of the coil.

4. A duct forming device as in claim 3 in which the coils of wire are provided with spacing means establishing the spacing between successive turns of the coil.

5. A duct forming device as in claim 1 in which the filter means comprises a plurality of coaxial annular discs defining fluid openings between successive discs.

6. A duct forming device as in claim 5 in which the discs are each provided with spacing means establishing a predetermined minimum spacing between discs.

7. A duct forming device for casing adapted to be lowered into a bore hole in the ground, comprising:
   a shiftable member defining at least a portion of a fluid duct extending through the casing wall between the interior and the exterior of the casing;
   means mounting the shiftable member on the casing for travel from an initial retracted position to an extended position;
   filter means carried on the shiftable member to travel therewith, said filter means having a generally cylindrical filtering area and comprising a plurality of parallel, elongated filter elements defining between successive elements a plurality of narrow, elongated fluid filtering openings extending circumferentially around the shiftable member;
   means establishing a predetermined spacing between successive elements;
   a chemically destructible cover over the filter means exposing the filter when removed;
   and chemically destructible closure means in the fluid duct;
   said filter means being exposed to fluid outside the casing when the shiftable member is extended.

8. A duct forming device as in claim 7 in which the filter means comprises a helically wound coil of wire with fluid openings between successive turns of the coil.

9. A duct forming device as in claim 7 in which the filter means comprises a plurality of coaxial annular discs defining fluid openings between successive discs.

10. A duct forming device as in claim 7 that also includes means forming a collection passage extending across a plurality of said filtering openings at the base thereof to receive fluid from said filtering openings.

11. A fine sand filter construction for a duct forming device adapted to be lowered on casing into a bore hole in the ground, comprising:
   inner and outer tubular members mounted on the casing and forming at least a part of a fluid duct extending between the interior and the exterior of the casing, the outer member mounting the inner member for relative longitudinal sliding movement between a retracted position in which the inner member is substantially inside the outer member and an extended position in which the inner member projects for a portion of its length beyond the outer member;
   the inner member having an interior passage opening to the inner end of the inner member and transverse passage means extending between the interior passage and the circumferential surface of the inner member;
   a plurality of rigid, parallel, circumferentially extending filter elements defining between them a series of narrow elongated openings admitting fluid to the circumferential surface of the inner member;

a chemically destructible, sheath around the filter elements inhibiting access to said openings of substances in the well, said sheath being substantially covered by the outer member when the inner member is in said retracted position;

and chemically destructible means closing the inner end of the interior passage in said inner member and providing a portion of a surface adapted to receive fluid pressure from within the casing to move the inner member to the extended position in which filter elements are accessible to well fluids after the sheath is removed.

12. A fine sand filter according to claim 11 in which the sheath is perforated.

References Cited
UNITED STATES PATENTS

| | | | |
|---|---|---|---|
| 956,080 | 4/1910 | Hall | 166—232 |
| 1,570,725 | 1/1926 | Benckenstein | 166—235 |
| 1,811,235 | 6/1931 | King | 166—229 |
| 2,004,071 | 6/1935 | Hannesschlager | 166—235 |
| 2,042,537 | 6/1936 | Liddell | 166—232 X |
| 2,540,123 | 2/1951 | Kinley | 166—229 X |
| 2,903,069 | 9/1959 | Lebourg et al. | 166—100 |
| 2,981,333 | 4/1961 | Miller et al. | 166—228 X |
| 3,326,291 | 6/1967 | Zandmer | 166—100 |

CHARLES E. O'CONNELL, *Primary Examiner.*

DAVID H. BROWN, *Examiner.*